United States Patent
Wulff et al.

(10) Patent No.: US 12,305,090 B2
(45) Date of Patent: May 20, 2025

(54) PROTECTIVE FILMS MADE OF POLYOLEFIN SUPPORT MATERIAL, PRIMER AND RADIATION-CROSSLINKABLE HOT MELT ADHESIVE

(71) Applicant: BASF SE, Ludwigshafen am Rhein (DE)

(72) Inventors: Dirk Wulff, Ludwigshafen (DE); Holger Kern, Ludwigshafen (DE); Matthias Gerst, Ludwigshafen (DE); Christoph Kiener, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 375 days.

(21) Appl. No.: 16/649,886

(22) PCT Filed: Sep. 28, 2018

(86) PCT No.: PCT/EP2018/076425
§ 371 (c)(1),
(2) Date: Mar. 23, 2020

(87) PCT Pub. No.: WO2019/072590
PCT Pub. Date: Apr. 18, 2019

(65) Prior Publication Data
US 2020/0270487 A1    Aug. 27, 2020

(30) Foreign Application Priority Data
Oct. 11, 2017    (EP) .................................. 17195900

(51) Int. Cl.
*C09J 7/25* (2018.01)
*C08L 75/06* (2006.01)
(Continued)

(52) U.S. Cl.
CPC ................. *C09J 7/35* (2018.01); *C08L 75/06* (2013.01); *C09J 7/29* (2018.01); *C09J 7/385* (2018.01);
(Continued)

(58) Field of Classification Search
None
See application file for complete search history.

(56) References Cited

U.S. PATENT DOCUMENTS

| 3,905,929 A | 9/1975 | Noll |
| 3,920,598 A | 11/1975 | Reiff et al. |

(Continued)

FOREIGN PATENT DOCUMENTS

| CA | 1 129 128 | 8/1982 |
| CN | 103347918 A | 10/2013 |

(Continued)

OTHER PUBLICATIONS

DE 102012218335 English Machine Translation.*
(Continued)

*Primary Examiner* — Frank D Ducheneaux
(74) *Attorney, Agent, or Firm* — Faegre Drinker Biddle & Reath LLP

(57) ABSTRACT

Described herein is a protection film comprising a polyolefin carrier material, a precoating of the polyolefin carrier material with a primer selected from polyurethane dispersions and a pressure-sensitive adhesive layer of a radiation-cross-linked hotmelt adhesive. A process for producing such protection films is also described.

16 Claims, 1 Drawing Sheet

(51) Int. Cl.
*C09J 7/29* (2018.01)
*C09J 7/35* (2018.01)
*C09J 7/38* (2018.01)
*C09J 7/50* (2018.01)
*C09J 133/08* (2006.01)

(52) U.S. Cl.
CPC ............... *C09J 7/50* (2018.01); *C09J 133/08* (2013.01); *C09J 2301/414* (2020.08); *C09J 2301/416* (2020.08); *C09J 2423/006* (2013.01); *C09J 2423/046* (2013.01); *C09J 2423/106* (2013.01); *C09J 2433/00* (2013.01); *C09J 2475/003* (2013.01)

(56) References Cited

U.S. PATENT DOCUMENTS

| | | | |
|---|---|---|---|
| 4,192,937 A | 3/1980 | Noll et al. | |
| 4,269,748 A | 5/1981 | Nachtkamp et al. | |
| 4,292,226 A | 9/1981 | Wenzel et al. | |
| 5,527,616 A * | 6/1996 | Hatano | C08G 18/10 528/80 |
| 5,814,685 A * | 9/1998 | Satake | C09D 11/326 525/902 |
| 6,194,523 B1 * | 2/2001 | Murata | C08G 18/6659 525/440.12 |
| 7,070,051 B2 * | 7/2006 | Kanner | A61B 17/06133 206/460 |
| 2006/0142408 A1 * | 6/2006 | Liu | C07C 271/12 522/6 |
| 2010/0266854 A1 * | 10/2010 | Kraus | C08G 18/722 428/424.2 |
| 2013/0009365 A1 | 1/2013 | Kabutoya et al. | |
| 2013/0273359 A1 * | 10/2013 | Arndt | C08G 18/758 156/182 |
| 2017/0283661 A1 * | 10/2017 | Yonezaki | C08F 220/1804 |

FOREIGN PATENT DOCUMENTS

| | | | |
|---|---|---|---|
| CN | 104254441 A | 12/2014 | |
| DE | 1 495 745 | 6/1969 | |
| DE | 1 954 090 | 5/1971 | |
| DE | 2 034 479 | 1/1972 | |
| DE | 39 11 827 A1 | 10/1990 | |
| DE | 10 2004 058 070 A1 | 6/2006 | |
| DE | 10 2012 218 335 A1 | 4/2013 | |
| EP | 0 246 848 A2 | 11/1987 | |
| EP | 0 376 054 A1 | 7/1990 | |
| EP | 0 377 191 A2 | 7/1990 | |
| EP | 0 445 641 A1 | 9/1991 | |
| EP | 0 622 378 A1 | 11/1994 | |
| EP | 1 213 306 A2 | 6/2002 | |
| EP | 2 541 105 A2 | 1/2013 | |
| JP | 2006-182652 A | 7/2006 | |
| WO | WO 01/23488 A1 | 4/2001 | |
| WO | WO-2006058694 A1 * | 6/2006 | ............ C08F 220/18 |
| WO | WO 2012/168208 A1 | 12/2012 | |

OTHER PUBLICATIONS

WO 2012/168208 English Machine Translation.*
WO 2006058694 English Machine Translation.*
Aldrich Data Sheet (Year: 2019).*
International Search Report issued Dec. 13, 2018 in PCT/EP2018/076425 filed Sep. 28, 2018, citing documents AA and AH-AK therein, 2 pages.

* cited by examiner

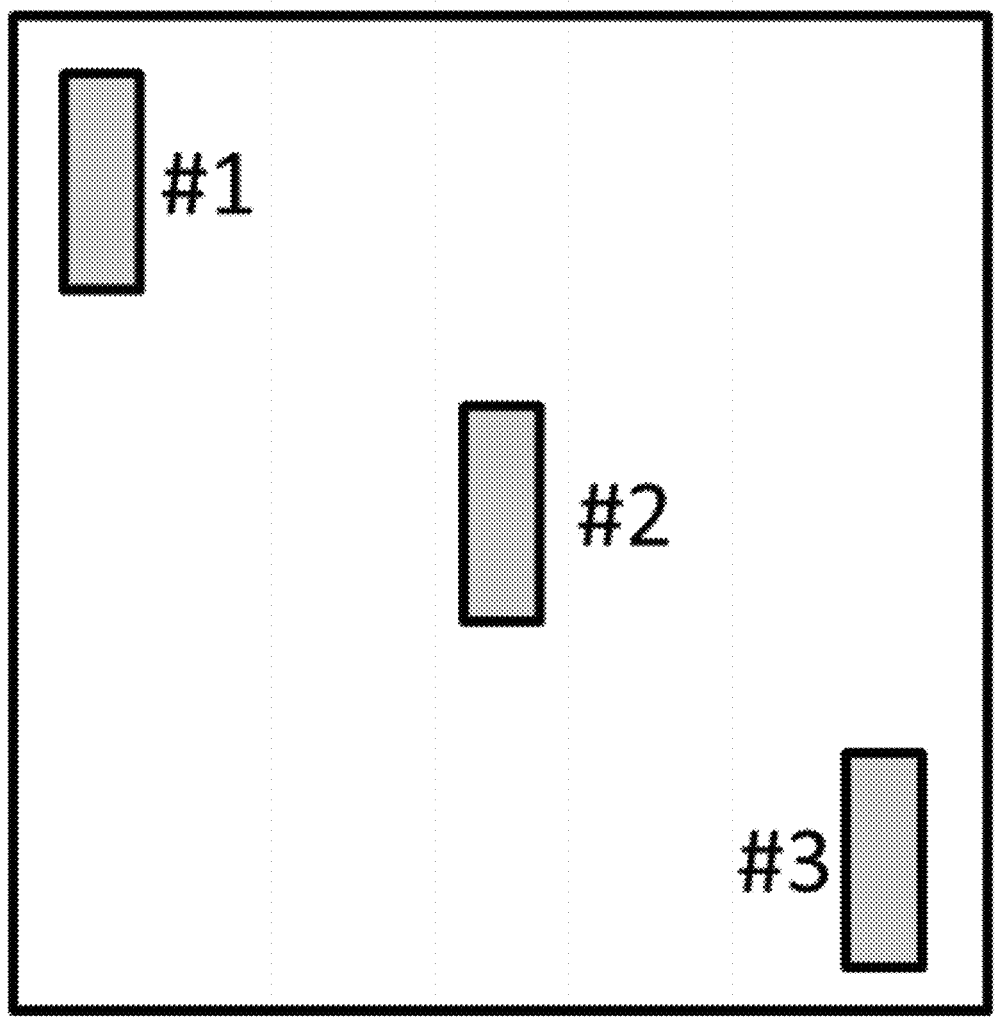

PROTECTIVE FILMS MADE OF POLYOLEFIN SUPPORT MATERIAL, PRIMER AND RADIATION-CROSSLINKABLE HOT MELT ADHESIVE

CROSS-REFERENCE TO RELATED APPLICATIONS

This application is a National stage application (under 35 U.S.C. § 371) of PCT/EP2018/076425, filed Sep. 28, 2018, which claims benefit of European Application No. 17195900.0, filed Oct. 11, 2017, both of which are incorporated herein by reference in their entirety.

The invention relates to protection films comprising a polyolefin carrier material, a precoating of the polyolefin carrier material comprising a primer and a pressure-sensitive adhesive layer of a radiation-crosslinked hotmelt adhesive.

Protection films are generally applied by adhesion to substrate surfaces of a very wide variety of chemical types in order to provide them with short-term protection from damage through chemical or physical influences during transport or storage. Protection films are also used for example in large surface area shaped substrates such as automobiles or other commercial products made of metal (for example brushed steel), glass or plastic, for example electronic devices, monitors, window frames made of plastic (for example PVC). Protection films generally consist of a carrier material, often polyolefin films, coated with an adhesive.

The protection films should be easily removable and upon removal the adhesive on the protection film should remain on the film material as completely as possible and ideally leave no residues on the substrate, i.e. removal should bring about adhesion failure between the substrate surface and the adhesive layer. In other words the best possible anchoring of the pressure-sensitive adhesive to the removable polyolefin carrier material coupled with residueless removal behavior from the widest possible range of substrates is desired. To improve anchoring, a surface pretreatment of the polyolefin films, for example by corona treatment or plasma pretreatment, is carried out before coating with the pressure-sensitive adhesive. An ideally constant and not excessively high peel strength, even after aging, is also desired.

Protection films generally employ pressure-sensitive adhesives as the adhesive. Known forms of pressure-sensitive adhesives for protection films include solutions of adhesive polymers or rubber in organic solvents and aqueous polymer dispersions. The polymer solutions or aqueous polymer dispersions are coated onto the polyolefin carrier film and an additional drying step for removal of solvent or water is required. Water- and solvent-free pressure-sensitive adhesives are therefore desirable. Rubber solutions in particular show good anchoring of the adhesive to polyolefin films for three reasons: i) adhesives based on natural or synthetic rubber (e.g. polyisoprene) belong to the chemical class of polyolefins just like the carrier materials of protection films, which are often made of polyethylene, polypropylene or a mixture thereof, ii) rubbers are blended with crosslinking agents which also react with the corona- or plasma-pretreated polyolefin film, thus increasing anchoring. Known crosslinker systems for rubbers are sulfur or sulfur-releasing compounds, phenol-formaldehyde resins, di- or polyamines or di- or polyhydrazines and also di- or polyisocyanates, wherein in the field of protection films it is the latter that are preferably employed. iii) The organic solvent of the adhesive solutions swells the polyolefin film and thus enables the polyisoprene chains to diffuse into the carrier material. After removal of the solvent, the polymer chains that have diffused into the carrier material remain therein. The use of organic solvents is increasingly undesirable for ecological reasons. Solvent-free hotmelt adhesives have a better ecological profile than solvent-based systems. However, hotmelt adhesives based on polyacrylates have the disadvantage compared to rubber-based adhesive solutions that the anchoring on polyolefin films is often insufficient for residueless removable protection film applications since little, if any, diffusion of polyacrylate chains into a polyolefin film takes place, thus potentially resulting in residues on the substrate when the protection film is detached from the substrate. It is known to the person skilled in the art that better adhesion to polyolefin films can be achieved by surface treatment of the films, for example by corona treatment, plasma pretreatment or coating with a primer. However, it has been found that in the case of coating polyolefin films with polyacrylate hotmelt adhesives these pretreatments are often still not sufficient for applications as protection films.

Radiation-crosslinkable hotmelt adhesives based on (meth)acrylate polymers and the use thereof as pressure-sensitive adhesives are known, for example, from DE 102004058070, EP 246 848 A, EP 377 191 A, EP 445 641 A, EP 376 054 A or WO 01/23488. Radiation-crosslinkable hotmelt adhesives for removable carriers are known from WO 01/023488 for example.

The present invention accordingly has for its object to provide a protection film coated with a solvent-free and water-free pressure-sensitive adhesive which exhibits improved anchoring of the pressure-sensitive adhesive on the removable carrier coupled with very largely residueless removal behavior from the widest possible range of substrate surfaces and a very largely constant peel strength even after aging.

The object is achieved according to the invention by a protection film comprising
  (a) a polyolefin carrier material whose surface to be coated has been pretreated, for example by corona treatment or plasma treatment,
  (b) a precoating of the polyolefin carrier material with at least one primer selected from polyurethane dispersions and
  (c) a pressure-sensitive adhesive layer, wherein the pressure-sensitive adhesive layer is formed by radiation crosslinking of a radiation-crosslinkable hotmelt adhesive and wherein the radiation-crosslinkable hotmelt adhesive comprises at least one poly(meth)acrylate formed from
    (i) at least 50% by weight of C1- to C18-alkyl (meth)acrylates and
    (ii) at least one ethylenically unsaturated monomer which comprises at least one polar group (hereinbelow also referred to as a polar monomer), wherein the polar group is selected from carboxylic acid groups, carboxylic anhydride groups, hydroxyl groups, amide groups, urethane groups, urea groups, piperidinyl groups, piperazinyl groups, morpholinyl groups, imidazoyl groups, ureido groups, pyrrolidone groups and combinations of two or more of the recited groups;
  and wherein the radiation-crosslinkable hotmelt adhesive comprises at least one photoinitiator and the photoinitiator is in the form of an additive not bonded to the poly(meth)acrylate and/or the photoinitiator is incorporated into the poly(meth)acrylate by polymerization.

The text below occasionally uses the designation "(meth) acrylate" or similar as an abbreviating notation for "acrylate or methacrylate". In the designation Cx alkyl (meth)acrylate and analogous designations, x denotes the number of carbons (carbon atoms) in the alkyl group.

Reported quantities for monomers of a polymer are based, unless otherwise explicitly stated, on 100 pads by weight of the sum of all monomers.

A pressure-sensitive adhesive is a viscoelastic adhesive which sets to form a film at room temperature (20° C.) that remains permanently tacky and adhesive in the dry state. Adhesion to substrates is effected immediately by gentle pressure.

The term radiation-crosslinkable is to be understood as meaning that the hotmelt adhesive comprises at least one compound having at least one radiation-sensitive group and a crosslinking reaction is induced upon irradiation. Irradiation for crosslinking is preferably carried out using actinic radiation, preferably UV light, in particular UV-C radiation. A radiation-crosslinkable hotmelt adhesive preferably comprises at least one photoinitiator. The photoinitiator may be in the form of an additive not bonded to the poly(meth) acrylate and/or the photoinitiator may be incorporated into the poly(meth)acrylate by polymerization.

Hotmelt adhesives, also known as hot glue, are solvent-free (i.e. not dissolved or dispersed in water or organic solvents) products that are more or less solid at room temperature and that in the hot state are sufficiently fluid to be applicable to an adherend surface due to the accompanying viscosity reduction and upon cooling produce the adhesive bond, with radiation-crosslinkable hotmelt adhesives additionally being irradiated here.

In radiation-crosslinkable pressure-sensitive adhesives the cohesion, i.e, the inner strength of the adhesive layer, is achieved after coating the adhesive onto a carrier by subsequent photochemically induced crosslinking.

The radiation-crosslinkable poly(meth)acrylate is formed to an extent of at least 50% by weight or at least 60% by weight or at least 80% by weight from C1- to C18-alkyl (meth)acrylates (monomers M1). Preference is given to C1- to C10-alkyl (meth)acrylates, or C4- to C10-alkyl (meth) acrylates, or C1-C8 alkyl (meth)acrylates, in particular C4- to C8-alkyl (meth)acrylates, for example methyl (meth) acrylate, ethyl acrylate, n-butyl acrylate, n-hexyl acrylate, 2-propylhexyl acrylate and 2-ethylhexyl acrylate and mixtures thereof. n-Butyl acrylate and 2-ethylhexyl acrylate are particularly preferred. The radiation-crosslinkable poly (meth)acrylate is preferably formed to an extent of at least 60% by weight from C4- to C10-alkyl (meth)acrylates, preferably selected from n-butyl acrylate and 2-ethylhexyl acrylate.

The radiation-crosslinkable poly(meth)acrylate polymer may be formed from further ethylenically unsaturated compounds as synthesis components, for example vinyl esters of carboxylic acids comprising up to 20 carbon atoms, vinylaromatics having up to 20 carbon atoms, ethylenically unsaturated nitriles, vinyl halides, vinyl ethers of alcohols comprising 1 to 10 carbon atoms, aliphatic hydrocarbons having 2 to 8 carbon atoms and 1 or 2 double bonds or mixtures of these monomers. Vinyl esters of carboxylic acids having 1 to 20 carbons are, for example, vinyl laurate, vinyl stearate, vinyl propionate, Versatic acid vinyl esters, and vinyl acetate. Suitable vinylaromatic compounds include for example vinyltoluene, α- and p-methylstyrene, alpha-butylstyrene, 4-n-butylstyrene, 4-n-decylstyrene and preferably styrene. Examples of nitriles include acrylonitrile and methacrylonitrile. The vinyl halides are ethylenically unsaturated compounds substituted by chlorine, fluorine or bromine, preferably vinyl chloride and vinylidene chloride. Examples of vinyl ethers include vinyl methyl ether or vinyl isobutyl ether. Preference is given to vinyl ethers of alcohols comprising 1 to 4 carbon atoms. Hydrocarbons having 2 to 8 carbons and two olefinic double bonds include butadiene, isoprene and chloroprene.

The monomers having polar groups preferably have a water solubility at 21° C. of more than 5 g/liter or more than 10 g/liter. The poly(meth)acrylate copolymer is preferably formed to an extent of 0.1% to 30% by weight, particularly preferably 0.3% to 25% by weight, 0.5% to 15% by weight, not less than 1% to 15% by weight or not less than 1% to 5% by weight, from the monomers having polar groups, wherein monomers having at least one acid group, in particular at least one carboxylic acid group, are preferred.

Contemplated polar monomers include in particular monomers having carboxylic acid, sulfonic acid or phosphonic acid groups. Carboxylic acid groups are preferred. These include for example acrylic acid, methacrylic acid, itaconic acid, maleic acid or fumaric acid. Preferred monomers having carboxylic acid groups are acrylic acid and methacrylic acid.

Further polar monomers are for example (meth)acrylamide and hydroxyl-comprising monomers, in particular C1-C10-hydroxyalkyl (meth)acrylates. Preferred monomers having hydroxyl groups are C1-C10-hydroxyalkyl (meth) acrylates, in particular hydroxyethyl (meth)acrylate and hydroxypropyl (meth)acrylate.

The hotmelt adhesive/poly(meth)acrylate is radiation-crosslinkable, for example by irradiation with UV light. The hotmelt adhesive then comprises at least one photoinitiator. The photoinitiator may be exclusively in the form of an additive not bonded to the poly(meth)acrylate. In another embodiment the photoinitiator is exclusively in the form of a component incorporated into the poly(meth)acrylate by polymerization. However, a combination of these two embodiments is also possible. The photoinitiator may be selected for example from so-called α-splitters, i.e. photoinitiators, in which a chemical compound is split to form 2 radicals which initiate the further crosslinking or polymerization reactions. These include for example acylphosphine oxides (Lucirin® line from BASF), hydroxyalkylphenones (for example Irgacure® 184), benzoin derivatives, benzil derivatives, dialkyloxyacetophenones. They may especially be so-called H-abstractors which detach a hydrogen atom from the polymer chain, for example photoinitiators having a carbonyl group. This carbonyl group inserts itself into a C—H bond to form a C—C—O—H moiety. Examples include in particular acetophenone, benzophenone and derivatives thereof. Both classes of photoinitiators may be used alone or else in admixture. It is particularly preferable when a photoinitiator incorporated into the polymer chain by free-radical copolymerization is concerned. The photoinitiator preferably comprises an acryloyl or (meth)acryloyl group to this end.

Photoinitiators that may be added to the polymer as an additive are, for example, acetophenone, benzoin ether, benzyl dialkyl ketals or derivatives thereof. The content of the added photoinitiator is preferably 0.05 to 10 parts by weight, particularly preferably 0.1 to 5 parts by weight per 100 parts by weight of poly(meth)acrylate.

By irradiation with high-energy light, in particular UV light, the photoinitiator or the photoinitiator group brings about crosslinking of the polymer, preferably by means of a chemical grafting reaction of the photoinitiator group with a spatially adjacent polymer or oligomer chain. The crosslinking may in particular be effected by insertion of a carbonyl group of the photoinitiator into an adjacent C—H bond to form a —C—C—O—H moiety. The wavelength range in which the photoinitiator group may be activated, i.e. which comprises the primary absorption bands of the photoinitiator group, is preferably 200 to 450 nm, particularly preferably 250 to 350 nm, very particularly preferably 250 to 280 nm.

The radiation-crosslinkable poly(meth)acrylate may be an adhesive based on a polymer comprising a photoinitiator incorporated by polymerization. The poly(meth)acrylate may be produced by free radical polymerization of ethylenically unsaturated monomers with co-polymerization of at least one radiation-sensitive, free-radically polymerizable organic compound. Radiation-sensitive, free-radically polymerizable organic compounds are hereinbelow referred to as polymerizable photoinitiator for short. The polymerizable photoinitiator may be incorporated into the polymer chain of copolymers by free radical copolymerization. Polymerizable photoinitiators preferably have the following principle structure:

A-X—B wherein A is a monovalent organic radical which preferably comprises a phenone group as the radiation-sensitive group, X is an ester group selected from -O—C(=O)—, —(C=O)—O— and —O—(C=O)—O— and B is a monovalent organic radical comprising an ethylenically unsaturated free-radically polymerizable group. Preferred radicals A are radicals comprising at least one structural element derived from phenones, in particular from acetophenones or benzophenones. Preferred radicals B comprise at least one, preferably precisely one, acrylic or methacrylic group.

The ethylenically unsaturated group may be directly bonded to group X. The radiation-sensitive group may likewise be directly bonded to the group X. However, there may also be a spacer group between the ethylenically unsaturated group and the group X and between the radiation-sensitive group and group X respectively. The spacer group may have a molecular weight of up to 500, in particular up to 300 or 200, g/mol for example.

Suitable copolymerizable photoinitiators are acetophenone or benzophenone derivatives which comprise at least one, preferably one, ethylenically unsaturated group as described for example in EP 377191 A or EP 1213306 A. The ethylenically unsaturated group is preferably an acryloyl or methacryloyl group. The ethylenically unsaturated group may be directly bonded to the phenyl ring of the acetophenone or benzophenone derivative. There is generally a spacer group between the phenyl ring and the ethylenically unsaturated group. The spacer group may comprise for example up to 100 carbon atoms.

A preferred group X is the carbonate group —O—(C=O)—O—. Preferred polymerizable photoinitiators are compounds of formula F-1:

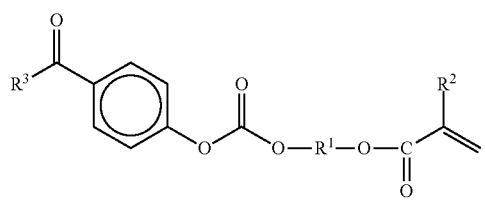

F-1 wherein R1 represents an organic radical having up to 30 carbon atoms, R2 represents an H atom or a methyl group and R3 represents a substituted or unsubstituted phenyl group or a C1-C4-alkyl group. R1 particularly preferably represents an alkylene group, in particular a C2-C8-alkylene group. R3 particularly preferably represents a methyl group or a phenyl group, very particularly preferably a phenyl group.

Further acetophenone and benzophenone derivatives suitable as copolymerizable photoinitiators are, for example, those of formula F-2

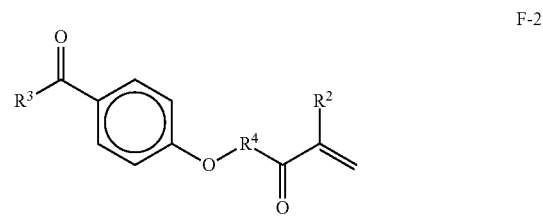

F-2 wherein R2 and R3 are as defined above and R4 may represent a single bond or (—CH2-CH2-O)n, wherein n represents an integer from 1 to 12.

The hotmelt adhesive preferably comprises 0.0001 to 0.5 mol, particularly preferably 0.0002 to 0.1 mol, very particularly preferably 0.003 to 0.01 mol, of the photoinitiator or of the molecular group active as a photoinitiator and bound to the polymer per 100 g of poly(meth)acrylate.

In the case of the photoinitiator incorporated by polymerization the poly(meth)acrylate is preferably formed to an extent of not less than 0.5% by weight, preferably not less than 1% by weight, for example from 0.5% to 10% by weight, from 1% to 5% by weight or from 1% to 4% by weight, from at least one ethylenically unsaturated, copolymerizable compound having a photoinitiator group.

A radiation-crosslinkable poly(meth)acrylate preferred according to the invention is formed from
(a1) at least 60% by weight of at least one acrylate selected from the group consisting of n-butyl acrylate, n-hexyl acrylate, 2-ethylhexyl acrylate, propylheptylacrylate and mixtures thereof,
(a2) 1% to 5% by weight of at least one monomer having polar groups, wherein the polar groups are selected from carboxylic acid groups, carboxamide groups, pyrrolidone groups, urethane groups and urea groups,
(a3) 0.5% to 4% by weight of at least one ethylenically unsaturated copolymerizable photoinitiator and
(a4) 0% to 25% by weight of at least one further monomer distinct from the monomers (a1) to (a3), preferably methyl (meth)acrylate.

Before crosslinking radiation-crosslinkable poly(meth)acrylates have a glass transition temperature of preferably not more than 10° C., for example from −60° C. to +10° C., in particular in the range from −60° C. to 0° C., or from −55° C. to −10° C., particularly preferably from −55° C. to −20° C. The glass transition temperature is determined by differential scanning calorimetry (ASTM D 3418-08, midpoint temperature). The glass transition temperature of the polymer is the glass transition temperature obtained when evaluating the second heating curve (heating rate 20° C./min).

The so-called Fox equation allows the person skilled in the art to identify copolymers in the appropriate Tg range in advance and to produce them in a targeted manner by suitable variation of the type and amount of the monomers. According to Fox (T. G. Fox, Bull. Am. Phys. Soc. 1956 [Ser. II] 1, page 123 and according to Ullmann's Encyclopedia of Industrial Chemistry, vol. 19, page 18, 4th edition, Verlag Chemie, Weinheim, 1980) the glass transition temperature of at most weakly crosslinked copolymers is given to a good approximation by:

$$1/T_g = x^1/T_g^1 + x^2/T_g^2 + \ldots x^n/T_g^n,$$

wherein $x^1$, $x^2$, ... $x^n$ are the mass fractions of the monomers 1, 2, ... n and $T_g^1$, $T_g^2$, ... $T_g^n$ are the glass transition temperatures in degrees kelvin of the polymers constructed from only one of the monomers 1, 2, ... n at a time. The $T_g$ values for the homopolymers of the majority of monomers are known and are listed for example in Ullmann's Encyclopedia of Industrial Chemistry, vol. 5, Vol. A21, page 169, VCH Weinheim, 1992; further sources for glass transition temperatures of homopolymers are, for example, J. Brandrup, E. H. Immergut, Polymer Handbook, $1^{st}$ Ed., J. Wiley, New York 1966, $2^{nd}$ Ed. J. Wiley, New York 1975, and $3^{rd}$ Ed. J. Wiley, New York 1989.

The poly(meth)acrylate of the hotmelt adhesive preferably has a K value of not less than 20, for example of 30 to 80, particularly preferably of 40 to 60, measured in tetrahydrofuran (1% solution, 21° C.). The Fikentscher K value is a measure of the molecular weight and the viscosity of the polymer. The viscosity is measured using a capillary viscometer. Operating procedures may be found in DIN EN ISO 1628-1:2012-10.

The poly(meth)acrylates are producible by copolymerizing the monomeric components, optionally including the copolymerizable photoinitiator, using the customary polymerization initiators and optionally regulators, wherein polymerization is carried out at the customary temperatures in bulk, in emulsion, for example in water or liquid hydrocarbons, or in solution. The poly(meth)acrylates are preferably produced by polymerization of the monomers in organic solvents, in particular in organic solvents having a boiling range of 50° C. to 150° C., preferably of 60° C. to 120° C., using the customary amounts of polymerization initiators which are generally 0.01% to 10% by weight, in particular 0.1% to 4% by weight, based on the total weight of the monomers. The polymers may be produced at temperatures of 20° C. to 150° C., preferably at temperatures in the range from 70° C. to 120° C., and pressures of 0.1 to 100 bar (absolute), preferably at 0.3 to 10 bar, in the presence of 0.01% to 10% by weight of peroxides or azo starters as polymerization initiators based on the monomers and in the presence of 0% to 200% by weight of inert solvents, preferably 5% to 25% by weight based on the monomers, i.e. by solution or bulk polymerization. The reaction is preferably carried out under increasing vacuum, for example by reducing the pressure from standard pressure (1 bar) to 500 mbar (absolute). Solvents are, for example, hydrocarbons, alcohols such as methanol, ethanol, propanol, butanol, isobutanol, ketones such as acetone, methyl ethyl ketone, methyl isobutyl ketone, ethyl acetate, nitriles such as acetonitrile and benzonitrile or mixtures of the recited solvents. In a preferred embodiment the solvents for the polymerization are one or more ketones having a boiling point of below 150° C. at standard pressure (1 bar).

Suitable polymerization initiators include for example azo compounds, ketone peroxides and alkyl peroxides, for example acyl peroxides such as benzoyl peroxide, dilauroyl peroxide, didecanoyl peroxide, isononanoyl peroxide, alkyl esters such as tert-butyl perpivalate, tert-butyl per-2-ethylhexanoate, tert-butyl permaleinate, tert-butyl perisononanoate, tert-butyl perbenzoate, tert-amyl per-2-ethylhexanoate, dialkyl peroxides such as dicumyl peroxide, tert-butylcumyl peroxide, di-tert-butyl peroxide and peroxodicarbonates.

Also employable as initiators are azo starters such as for example 2,2'-azobisisobutyronitril, 2,2'-azobis(methylisobutyrate) or 2,2'-azobis(2,4-dimethylvaleronitrile).

To perform the polymerization the reaction mixture may also be admixed with compounds which reduce the degree of polymerization, so-called polymerization regulators, for example in amounts of 0.1 to 0.8 parts by weight based on 100 parts by weight of the monomers to be polymerized. Suitable compounds include for example those having a thiol group, for example mercaptans such as mercaptoethanol, tert-butyl mercaptan, mercaptosuccinic acid, ethylhexyl thioglycolate, 3-mercaptopropyltrimethoxysilane or dodecyl mercaptan.

After the solution polymerization the solvents may optionally be removed under reduced pressure and at elevated temperatures, for example in the range from 100° C. to 150° C. The polymers may then be employed in a solvent-free state (solvent content preferably less than 2% by weight based on the total composition), i.e. as melts.

The hotmelt adhesive according to the invention preferably has a viscosity at zero shear of less than 100 Pa s at 130° C. It is employed in solvent-free, meltable form. Solvent present as a consequence of manufacture may be removed beforehand by suitable processes, preferably to a residual content of less than 0.5% by weight based on the solids content.

Contemplated hotmelt adhesives include in particular those which comprise water or organic solvent, for example from solution polymerization, only in small amounts, if at all, and are applied in the melt. The hotmelt adhesive preferably comprises less than 5 parts by weight, in particular less than 2 parts or less than 1 part by weight, of water and/or organic solvent based on 100 parts by weight of the total weight of the adhesive polymer. It is particularly preferable when the hotmelt adhesive is substantially free of water and organic solvents.

The hotmelt adhesive may comprise the customary added substances such as for example resins, plasticizers, antioxidants, crosslinkers, fillers, dyes, flow control agents, tackifiers (tackifying resins) etc.

To produce the adhesive coatings the hotmelt adhesives are applied as a melt to the polyolefin films pre-coated with a primer, thus at least partially coating the surface with an adhesive according to the invention. The hotmelt adhesive may be applied as a melt, i.e. generally at temperatures of 50° C. to 160° C., preferably 80° C. to 150° C., or more than 100° C.

The application rate of the pressure-sensitive adhesive is preferably 2 to 30 g/m², preferably 5 to 20 g/m². Layer thicknesses are for example 2 to 30 μm, preferably 5 to 20 μm.

Contemplated carriers include polyolefin films, for example thermoplastic films, for example made of polyethylene or polypropylene. The film thickness is preferably 10 to 250 μm or 30 to 100 μm, preferably 40 to 80 μm.

In addition the surfaces of the thermoplastic polymer films are pretreated, for example by Corona or plasma treatment. The protection films are coated with adhesive on one side. Preferred substrates to which the protection films may be bonded are glass, wood, metal, plastic, textiles or carpet.

After application to the carrier the radiation-crosslinkable hotmelt adhesive according to the invention is irradiated with high-energy radiation, preferably UV light, in particular UV-C radiation (200-280 nm), to effect crosslinking. To this end the coated substrates are generally placed on a conveyor belt and the conveyor belt is run past a radiation source, for example a UV lamp. The degree of crosslinking of the polymers depends on the duration and intensity of the irradiation. The total radiation energy is preferably 100 to 1500 mJ/cm$^2$ (based on the wavelength range 250 to 440 nm) or 10 to 100 mJ/cm$^2$ based on UV-C radiation (250 to 260 nm). Employable UV sources include the customary sources, for example intermediate pressure mercury lamps having a radiative power of 80 to 240 W/cm.

The polyolefin films are coated with primer at an application rate of preferably 0.05 to 3 g/m$^2$, particularly preferably 0.1 to 0.5 g/m$^2$.

Polyurethane dispersions suitable as primers are in principle obtainable by reaction of at least one polyisocyanate with at least one compound having at least two isocyanate-reactive groups and dispersion in water. Suitable polyurethanes also include so-called polyurethane-polyureas comprising not only polyurethane groups but also urea groups. The polyurethane dispersion preferably comprises at least one polyurethane formed from at least one polyisocyanate and at least one polymeric polyol. Suitable polymeric polyols are preferably selected from polyester diols, polyether diols, polycarbonate diols and mixtures thereof. The polymeric polyol preferably has a number-average molecular weight in the range from about 500 to 5000 g/mol. Polymeric diols are preferred. The polyurethane dispersion preferably comprises at least one polyurethane which comprises at least one polyisocyanate and a diol component incorporated by polymerization, of which a) 10-100 mol % based on the total amount of the diols have a molecular weight of 500 to 5000 g/mol and b) 0-90 mol % based on the total amount of the diols have a molecular weight of 60 to 500 g/mol.

The polyurethane is preferably constructed to an extent of at least 40% by weight, particularly preferably at least 60% by weight and very particularly preferably at least 80% by weight, based on the total weight of the monomers used for producing the polyurethane, from at least one diisocyanate and at least one polyether diol and/or polyester diol. Suitable further synthesis components to 100% by weight include for example the polyisocyanates recited below having at least three NCO groups and compounds distinct from the polymeric polyols having at least two isocyanate-reactive groups. These include for example diols; diamines; polymers distinct from polymeric polyols having at least two active hydrogen atoms per molecule; compounds having two active hydrogen atoms and at least one ionogenic/ionic group per molecule; and mixtures thereof.

The polyurethane preferably has a softening point or melting point in the range from −50° C. to 150° C., particularly preferably from 0° C. to 100° C. and very particularly preferably from 10° C. to 90° C. It is particularly preferable when the polyurethane has a melting point in the above-mentioned temperature range.

Preferred polyurethanes are constructed from:
a) at least one (preferably monomeric) diisocyanate,
b) at least one diol, wherein the component (b) comprises at least one diol having a number-average molecular weight in the range from 500 to 5000 g/mol,
c) at least one monomer distinct from the monomers (a) and (b) having at least one isocyanate group or at least one isocyanate-reactive group which further bears at least one hydrophilic group or a potentially hydrophilic group,
d) optionally at least one further compound distinct from the monomers (a) to (c) having at least two reactive groups selected from alcoholic hydroxyl groups, primary or secondary amino groups or isocyanate groups and e) optionally at least one monofunctional compound distinct from monomers (a) to (d) having a reactive group which is an alcoholic hydroxyl group, a primary or secondary amino group or an isocyanate group.

The component b) is preferably composed of
$b_1$) 10 to 100 mol % based on the total amount of component b) of diols having a molecular weight of 500 to 5000 g/mol,
$b_2$) 0 to 90 mol % based on the total amount of component b) of diols having a molecular weight of 60 to less than 500 g/mol.

It is particularly preferable when the ratio of the diols $b_1$) to the monomers $b_2$) is 0.1:1 to 5:1, particularly preferably 0.2:1 to 2:1. The diol b) is in particular selected from polytetrahydrofuran, polypropylene oxide and polyesterdiols selected for example from reaction products of dihydric alcohols with dibasic carboxylic acids and lactone-based polyesterdiols.

Compounds suitable as monomers (a) include in particular diisocyanates of formula $X(NCO)_2$, wherein X is an acyclic aliphatic hydrocarbon radical having 4 to 15 carbon atoms, a cycloaliphatic or aromatic hydrocarbon radical having 6 to 15 carbon atoms or an araliphatic hydrocarbon radical having 7 to 15 carbon atoms. Examples of such diisocyanates are tetramethylene diisocyanate, hexamethylene diisocyanate, dodecamethylene diisocyanate, 1,4-diisocyanatocyclohexane, 1-isocyanato-3,5,5-trimethyl-5-isocyanatomethylcyclohexane (IPDI), 2,2-bis(4-isocyanatocyclohexyl)propane, trimethylhexane diisocyanate, 1,4-diisocyanatobenzene, 2,4-diisocyanatotoluene, 2,6-diisocyanatotoluene, 4,4'-diisocyanatodiphenylmethane, 2,4'-diisocyanatodiphenylmethane, p-xylylene diisocyanate, tetramethylxylylene diisocyanate (TMXDI), the isomers of bis(4-isocyanatocyclohexyl)methane (HMDI), such as the trans/trans, the cis/cis and the cis/trans isomer, and mixtures composed of these compounds.

Such diisocyanates are commercially available. Mixtures of these isocyanates of particular importance are mixtures of the respective structural isomers of diisocyanatotoluene and diisocyanatodiphenylmethane, the mixture of 80 mol % of 2,4-diisocyanatotoluene and 20 mol % of 2,6-diisocyanatotoluene being particularly suitable. In addition, the mixtures of aromatic isocyanates such as 2,4-diisocyanatotoluene and/or 2,6-diisocyanatotoluene with aliphatic or cycloaliphatic isocyanates, such as hexamethylene diisocyanate or IPDI, are particularly advantageous, the preferred quantitative ratio of the aliphatic isocyanates to aromatic isocyanates being 1:9 to 9:1, in particular 4:1 to 1:4.

The diols (b1) may be polyester polyols and these are known for example from Ullmanns Encyclopedia of Industrial Chemistry, 4th edition, volume 19, pp. 62 to 65. Preference is given to using polyester polyols obtained by reaction of dihydric alcohols with dibasic carboxylic acids. Instead of using the free polycarboxylic acids, the polyester polyols may also be produced using the corresponding polycarboxylic anhydrides or corresponding polycarboxylic esters of lower alcohols or mixtures thereof. The polycarboxylic acids may be aliphatic, cycloaliphatic, araliphatic, aromatic or heterocyclic and may optionally be substituted, for example by halogen atoms, and/or unsaturated. Examples thereof include: suberic acid, azelaic acid, phthalic acid, isophthalic acid, phthalic anhydride, tetrahydrophthalic anhydride, hexahydrophthalic anhydride, tetrachlorophthalic anhydride, endomethylenetetrahydrophthalic anhydride, glutaric anhydride, maleic acid, maleic anhydride, fumaric acid, dimeric fatty acids. Preference is given to dicarboxylic acids of general formula HOOC—$(CH_2)_y$—

COOH, wherein y is a number from 1 to 20, preferably an even number from 2 to 20, for example succinic acid, adipic acid, sebacic acid and dodecanedicarboxylic acid. Suitable dihydric alcohols are, for example, ethylene glycol, propane-1,2-diol, propane-1,3-diol, butane-1,3-diol, butene-1,4-diol, butyne-1,4-diol, pentane-1,5-diol, neopentyl glycol, bis(hydroxymethyl)cyclohexanes such as 1,4-bis(hydroxymethyl)cyclohexane, 2-methylpropane-1,3-diol, methylpentanediols, furthermore diethylene glycol, triethylene glycol, tetraethylene glycol, polyethylene glycol, dipropylene glycol, polypropylene glycol, dibutylene glycol and polybutylene glycols. Preferred alcohols are those of general formula HO—$(CH_2)_x$—OH, wherein x is a number from 1 to 20, preferably an even number from 2 to 20. Examples thereof are ethylene glycol, butane-1,4-diol, hexane-1,6-diol, octane-1,8-diol and dodecane-1,12-diol. Neopentyl glycol is also preferred.

The diols (b1) may also be polycarbonate diols such as are obtainable for example by reaction of phosgene with an excess of the low molecular weight alcohols recited as synthesis components for the polyester polyols.

The diols (b1) may also be lactone-based polyester diols, specifically homopolymers or copolymers of lactones, preferably terminal hydroxyl-comprising addition products of lactones onto suitable difunctional starter molecules. Contemplated lactones preferably include those derived from compounds of general formula HO—$(CH_2)_z$—COOH, wherein z is a number from 1 to 20 and one hydrogen atom of a methylene unit may also be substituted by a $C_1$- to $C_4$-alkyl radical. Examples include epsilon-caprolactone, beta-propiolactone, gamma-butyrolactone and/or methyl-gamma-caprolactone and mixtures thereof. Suitable starter components are, for example, the low molecular weight dihydric alcohols recited hereinabove as synthesis components for the polyester polyols. The corresponding polymers of epsilon-caprolactone are particularly preferred. Lower polyester diols or polyether diols may also be employed as starters for producing the lactone polymers. Instead of the polymers of lactones, the corresponding chemically equivalent polycondensates of the hydroxycarboxylic acids corresponding to the lactones may also be employed.

The diols (b1) may also be polyether diols. Polyether diols are obtainable in particular by homopolymerization of ethylene oxide, propylene oxide, butylene oxide, tetrahydrofuran, styrene oxide or epichlorohydrin, for example in the presence of $BF_3$, or by addition of these compounds optionally in admixture or in succession onto starting components having reactive hydrogen atoms, such as alcohols or amines, for example water, ethylene glycol, propane-1,2-diol, propane-1,3-diol, 2,2-bis(4-hydroxyphenyl)propane or aniline. Polyether diols having a molecular weight of 500 to 5000 and especially 600 to 4500 are particularly preferred. A particularly preferred polyether diol is polytetrahydrofuran. Suitable polytetrahydrofurans may be produced by cationic polymerization of tetrahydrofuran in the presence of acidic catalysts, for example sulfuric acid or fluorosulfuric acid. Such methods of production are known to those skilled in the art. Suitable compounds b1) further include alpha, omega-diaminopolyethers producible by amination of polyalkylene oxides with ammonia.

$b_1$) only includes polyether diols formed to an extent of less than 20% by weight based on their total weight of ethylene oxide. Polyether diols comprising at least 20% by weight of incorporated ethylene oxide units are hydrophilic polyether diols that are included among the monomers c).

Optionally co-usable as monomers $b_1$) are polyhydroxyolefins, preferably those having 2 terminal hydroxyl groups, for example alpha-omega-dihydroxypolybutadiene, alpha-omega-dihydroxypolymethacrylate esters or alpha-omega-dihydroxypolyacrylate esters. Such compounds are disclosed in EP-A 622 378 for example. Further suitable polyols are polyacetals, polysiloxanes and alkyd resins.

It is preferable when at least 95 mol % of the diols $b_1$) are polyester dials and/or polytetrahydrofuran. It is particularly preferable to employ exclusively polyesterdiols and/or polytetrahydrofuran as dials $b_1$).

In a preferred embodiment the polyurethane is formed from at least one amorphous polymeric polyol, in particular at least one amorphous polyester polyol. Amorphous solids are solids whose building blocks are not arranged in crystal lattices, i.e. are non-crystalline. According to the invention amorphous polymeric polyols are especially polymeric polyols which do not have a melting point in the temperature range from −30° C. to +60° C.

The polyurethane preferably comprises amorphous polymeric polyols, preferably at least one amorphous polyester polyol, in an amount of more than 10% by weight or more than 20% by weight or more than 25% by weight, particularly preferably at least 35% by weight, based on the polyurethane.

The polyurethane is preferably altogether constructed from at least one amorphous polymeric polyol, preferably at least one amorphous polyester polyol, having a molecular weight of more than 500 and up to 4000 g/mol.

The polyurethane is preferably altogether constructed from:

10% to 80% by weight of at least one amorphous polymeric polyol, preferably at least one amorphous polyester polyol, having a molecular weight of more than 500 and up to 4000 g/mol.

It is preferable to use amorphous polyester dials obtained by reaction of dihydric alcohols with dibasic carboxylic acids. Instead of using the free polycarboxylic acids, the polyester polyols may also be produced using the corresponding polycarboxylic anhydrides or corresponding polycarboxylic esters of lower alcohols or mixtures thereof.

The at least one polycarboxylic acid used for producing the amorphous polyesterdiol (i) is preferably an aromatic dicarboxylic acid, in particular isophthalic acid. In a preferred embodiment a mixture of carboxylic acids composed of at least one aliphatic dicarboxylic acid having 3 to 10, preferably 4 to 8, carbon atoms and at least one aromatic dicarboxylic acid is used to produce the amorphous polyesterdiol (i). The mixing ratio is preferably from 0.5:1 to 2:1. A preferred dicarboxylic acid mixture is adipic acid/isophthalic acid, in particular in a ratio of 0.5:1 to 2:1.

Contemplated polyhydric alcohols for producing the amorphous polyesterdiols include for example ethylene glycol, propane-1,2-diol, propane-1,3-diol, butane-1,3-diol, butene-1,4-diol, butyne-1,4-diol, pentane-1,5-diol, neopentyl glycol, bis(hydroxymethyl)cyclohexanes such as 1,4-bis(hydroxymethyl)cyclohexane, 2-methylpropane-1,3-diol, methylpentanediols, furthermore diethylene glycol, triethylene glycol, tetraethylene glycol, polyethylene glycol, dipropylene glycol, polypropylene glycol, dibutylene glycol and polybutylene glycols. Preference is given to alcohols of the general formula HO—$(CH_2)_x$—OH, wherein x is a number from 1 to 20, preferably an even number from 2 to 20. Examples thereof are ethylene glycol, butane-1,4-diol, hexane-1,6-diol, octane-1,8-diol and dodecane-1,12-diol. Neopentyl glycol is also preferred. It is preferable to use at least one alkanediol having 2 to 10, preferably 4 to 8, carbon atoms to produce the amorphous polyesterdiols.

The polyurethane preferably comprises 10% to 80% by weight of at least one amorphous polyester diol having a number-average molecular weight of more than 500 to 4000 g/mol which is constructed from a mixture of at least one aliphatic dicarboxylic acid having 3 to 10, preferably 4 to 8, carbon atoms and at least one aromatic dicarboxylic acid in a ratio of 0.5:1 to 2:1 and at least one alkanediol having 2 to 10, preferably 4 to 8, carbon atoms.

Also employable as further macrodiols in addition to the amorphous polyesterdiols are non-amorphous, i.e. crystalline or semicrystalline, polyester polyols producible from polycarboxylic acids and polyhydric alcohols. Suitable polyhydric alcohols are those recited hereinabove. The polycarboxylic acids may be aliphatic, cycloaliphatic, araliphatic, aromatic or heterocyclic and may optionally be substituted, for example by halogen atoms, and/or unsaturated. Examples thereof include: suberic acid, azelaic acid, phthalic acid, isophthalic acid, phthalic anhydride, tetrahydrophthalic anhydride, hexahydrophthalic anhydride, tetrachlorophthalic anhydride, endomethylenetetrahydrophthalic anhydride, glutaric anhydride, maleic acid, maleic anhydride, fumaric acid, dimeric fatty acids. Preference is given to dicarboxylic acids of general formula HOOC—$(CH_2)_y$—COOH, wherein y is a number from 1 to 20, preferably an even number from 2 to 20, for example succinic acid, adipic acid, sebacic acid and dodecanedicarboxylic acid.

The molar ratio of amorphous polymeric polyol, preferably amorphous polyester polyol, to macrodiol distinct therefrom is preferably from 1:5 to 5:1, in particular from 1:2 to 2:1.

The hardness and the modulus of elasticity of the polyurethanes can be increased when as diols (b) not only the diols $b_1$) but also low-molecular-weight diols $b_2$) having a molecular weight of about 60 to 500, preferably of 62 to 200 g/ml, are employed. Employed monomers $b_2$) especially include the synthesis components of the short-chain alkanediols recited for the production of polyester polyols, wherein the unbranched diols having 2 to 12 carbon atoms and an even number of carbon atoms and also pentane-1,5-diol and neopentyl glycol are preferred. Contemplated diols $b_2$) include for example ethylene glycol, propane-1,2-diol, propane-1,3-diol, butane-1,3-diol, butene-1,4-diol, butyne-1,4-diol, pentane-1,5-diol, neopentyl glycol, bis(hydroxymethyl)cyclohexanes such as 1,4-bis(hydroxymethyl)cyclohexane, 2-methylpropane-1,3-diol, methylpentanediols, furthermore diethylene glycol, triethylene glycol, tetraethylene glycol, polyethylene glycol, dipropylene glycol, polypropylene glycol, dibutylene glycol and polybutylene glycols. Preferred alcohols are those of general formula HO—$(CH_2)_x$—OH, wherein x is a number from 1 to 20, preferably an even number from 2 to 20. Examples thereof are ethylene glycol, butane-1,4-diol, hexane-1,6-diol, octane-1,8-diol and dodecane-1,12-diol. Neopentyl glycol is also preferred.

In order to ensure that the polyurethanes are water-dispersible, the polyurethanes comprise as a synthesis component monomers (c) which are distinct from components (a) and (b) and bear at least one isocyanate group or at least one isocyanate-reactive group and moreover bear at least one hydrophilic group or a group which can be converted into a hydrophilic group. Hereinbelow, the term "hydrophilic groups or potentially hydrophilic groups" is abbreviated to "(potentially) hydrophilic groups". The (potentially) hydrophilic groups react with isocyanates substantially more slowly than the functional groups of the monomers used to construct the polymer main chain. The proportion of components comprising (potentially) hydrophilic groups in the total amount of components (a) to (f) is generally measured such that the molar amount of the (potentially) hydrophilic groups (preferably anionic or potentially anionic groups) based on the amount by weight of all monomers (a) to (e) is 30 to 1000, preferably 50 to 500 and particularly preferably 80 to 300 mmol/kg. The (potentially) hydrophilic groups may be nonionic or preferably (potentially) ionic hydrophilic groups.

Contemplated nonionic hydrophilic groups include in particular polyethylene glycol ethers composed of preferably 5 to 100, preferably 10 to 80, ethylene oxide repeating units. The content of polyethylene oxide units is generally 0% to 10% by weight, preferably 0% to 6% by weight, based on the amount by weight of all monomers (a) to (e). Preferred monomers comprising nonionic hydrophilic groups are polyethylene oxide diols comprising at least 20% by weight of ethylene oxide, polyethylene oxide monools and the reaction products of a polyethylene glycol and a diisocyanate which bear a terminally etherified polyethylene glycol radical. Such diisocyanates and processes for their production are recited in patent documents U.S. Pat. Nos. 3,905,929 and 3,920,598.

Ionic hydrophilic groups are especially anionic groups, such as the sulfonate, carboxylate and the phosphate group in the form of their alkali metal or ammonium salts, and cationic groups, such as ammonium groups, in particular protonated tertiary amino groups or quaternary ammonium groups. Potentially ionic hydrophilic groups are especially those which may be converted into the abovementioned ionic hydrophilic groups by simple neutralization, hydrolysis or quaternization reactions, i.e., carboxylic acid groups or tertiary amino groups for example. (Potentially) ionic monomers (c) are described in detail for example in Ullmann's Encyclopedia of Industrial Chemistry, 4th edition, volume 19, pp. 311-313 and for example in DE-A 1 495 745.

(Potentially) cationic monomers (c) of particular practical importance are especially monomers comprising tertiary amino groups, for example: tris(hydroxyalkyl)amines, N,N'-bis(hydroxyalkyl)alkylamines, N-hydroxyalkyldialkylamines, tris(aminoalkyl)amines, N,N'-bis(aminoalkyl)alkylamines, N-aminoalkyldialkylamines, wherein the alkyl radicals and alkanediyl units of these tertiary amines are independently of one another composed of 1 to 6 carbon atoms. Also contemplated are polyethers comprising tertiary nitrogen atoms and preferably two terminal hydroxyl groups, such as are obtainable in a manner customary per se for example by alkoxylation of amines comprising two hydrogen atoms attached to amine nitrogen, for example methylamine, aniline or N,N'-dimethylhydrazine. Such polyethers generally have a molar weight of between 500 and 6000 g/mol. These tertiary amines are converted into the ammonium salts either with acids, preferably strong mineral acids such as phosphoric acid, sulfuric acid, hydrohalic acids, or strong organic acids or by conversion with suitable quaternization agents such as $C_1$- to $C_6$-alkyl halides or benzyl halides, for example bromides or chlorides.

Contemplated monomers comprising (potentially) anionic groups typically include aliphatic, cycloaliphatic, araliphatic or aromatic carboxylic acids and sulfonic acids bearing at least one alcoholic hydroxyl group or at least one primary or secondary amino group. Preference is given to dihydroxyalkylcarboxylic acids, especially comprising 3 to 10 carbon atoms, as also described in U.S. Pat. No. 3,412,054. Preferred compounds include in particular compounds of general formula ($c_1$)

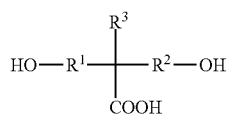 (c₁)

in which $R^1$ and $R^2$ represent a $C_1$- to $C_4$-alkanediyl group and $R^3$ represents a $C_1$- to $C_4$-alkyl group, especially dimethylolpropionic acid (DMPA). Corresponding dihydroxysulfonic acids and dihydroxyphosphonic acids such as 2,3-dihydroxypropanephosphonic acid are also suitable. Also suitable are dihydroxy compounds having a molecular weight of more than 500 to 10 000 g/mol and comprising at least 2 carboxylate groups as disclosed in DE-A 39 11 827. These are obtainable by reacting dihydroxy compounds with tetracarboxylic dianhydrides, such as pyromellitic dianhydride or cyclopentanetetracarboxylic dianhydride in a molar ratio of 2:1 to 1.05:1 in a polyaddition reaction. Suitable dihydroxy compounds are in particular the monomers (b2) cited as chain extenders and the diols (b1).

Contemplated monomers (c) comprising isocyanate-reactive amino groups further include aminocarboxylic acids such as lysine, beta-alanine or the adducts, cited in DE-A 20 34 479, of aliphatic diprimary diamines onto a,ß-unsaturated carboxylic or sulfonic acids. Such compounds for example conform to the formula ($c_2$)

 ($c_2$)

in which $R^4$ and $R^5$ independently of one another represent a $C_1$- to $C_6$-alkanediyl unit, preferably ethylene; and X represents COOH or $SO_3H$. Particularly preferred compounds of formula ($c_2$) are N-(2-aminoethyl)-2-aminoethanecarboxylic acid and N-(2-aminoethyl)-2-aminoethanesulfonic acid and the corresponding alkali metal salts, wherein sodium is a particularly preferred counterion. Also particularly preferred are the adducts of the abovementioned aliphatic diprimary diamines onto 2-acrylamido-2-methylpropanesulfonic acid as described for example in DE-B 1 954 090.

Where monomers containing potentially ionic groups are employed, their conversion into the ionic form may take place before, during, but preferably after the isocyanate polyaddition, since the solubility of the ionic monomers in the reaction mixture is frequently no more than poor. Neutralizing agents are for example ammonia, NaOH, triethanolamine (TEA), triisopropylamine (TIPA) or morpholine and derivatives thereof. The sulfonate or carboxylate groups are especially preferably present in the form of their salts with an alkali metal ion or with an ammonium ion as the counterion.

The monomers (d) which are distinct from the monomers (a) to (c) and which are optionally also constituents of the polyurethane are generally used for crosslinking or chain extension. These are generally more than dihydric nonphenolic alcohols, amines having 2 or more primary and/or secondary amino groups and compounds bearing not only one or more alcoholic hydroxyl groups but also one or more primary and/or secondary amino groups. Alcohols having a hydricity greater than 2 and which may be used to establish a certain degree of branching or crosslinking are, for example, trimethylolpropane, glycerol and sugar.

Also contemplated are monoalcohols which carry not only the hydroxyl group but also a further isocyanate-reactive group such as monoalcohols having one or more primary and/or secondary amino groups, for example monoethanolamine. Polyamines having 2 or more primary and/or secondary amino groups are primarily used when the chain extension and/or crosslinking is to take place in the presence of water since amines generally react with isocyanates more rapidly than alcohols or water. This is often necessary when aqueous dispersions of crosslinked polyurethanes or polyurethanes of high molecular weight are desired. The procedure in such cases comprises preparing prepolymers comprising isocyanate groups, rapidly dispersing said prepolymers in water and subsequently chain-extending or crosslinking said prepolymers by adding compounds comprising a plurality of isocyanate-reactive amino groups.

The polyurethane of the polyurethane dispersion is preferably chain-extended with at least one polyamine. Amines suitable for this purpose are generally polyfunctional amines in the molecular weight range from 32 to 500 g/mol, preferably from 60 to 300 g/mol, which comprise at least two amino groups selected from the group of the primary and secondary amino groups. Examples thereof are diamines such as diaminoethane, diaminopropanes, diaminobutanes, diaminohexanes, piperazine, 2,5-dimethylpiperazine, amino-3-aminomethyl-3,5,5-trimethylcyclohexane (isophoronediamine, IPDA), 4,4'-diaminodicyclohexylmethane, 1,4-diaminocyclohexane, aminoethylethanolamine, hydrazine, hydrazine hydrate or triamines such as diethylenetriamine or 1,8-diamino-4-aminomethyloctane. The amines may also be employed in blocked form, for example in the form of the corresponding ketimines (see, for example, CA-A 1 129 128), ketazines (cf., for example, U.S. Pat. No. 4,269,748) or amine salts (see U.S. Pat. No. 4,292,226). Oxazolidines, as are used, for example, in U.S. Pat. No. 4,192,937, also represent capped polyamines which can be used for producing the polyurethanes according to the invention for chain extension of the prepolymers. Use of such capped polyamines generally comprises mixing said polyamines with the prepolymers in the absence of water and subsequently mixing this mixture with the dispersing water or a portion of the dispersing water, thus releasing the corresponding polyamines hydrolytically. It is preferable to use mixtures of di- and triamines, particularly preferably mixtures of isophorone diamine (IPDA) and diethylene triamine (DETA).

The polyurethanes preferably comprise 1 to 30 mol %, particularly preferably 4 to 25 mol %, based on the total amount of components (b) and (d) of a polyamine comprising at least 2 isocyanate-reactive amino groups as monomers (d). Higher than difunctional isocyanates may also be used as monomers (d) for the same purpose. Commercially available compounds are, for example, the isocyanurate or the biuret of hexamethylene diisocyanate.

Monomers (e) that are optionally co-used are monoisocyanates, monoalcohols and monoprimary and -secondary amines. The proportion thereof is generally not more than 10 mol % based on the total molar amount of the monomers. These monofunctional compounds typically bear further functional groups such as olefinic groups or carbonyl groups and serve to introduce functional groups into the polyurethane which make the dispersal or crosslinking or further polymer-analogous reaction of the polyurethane possible. Contemplated therefor are monomers such as isopropenyl-a,a'-dimethylbenzyl isocyanate (TMI) and esters of acrylic or methacrylic acid such as hydroxyethyl acrylate or hydroxyethyl methacrylate.

Coatings having a particularly good profile of properties are obtained especially when the monomers (a) employed are substantially only aliphatic diisocyanates, cycloaliphatic diisocyanates or aralphatic diisocyanates. This monomer combination is superbly complemented as component (c) by alkali metal salts of diaminosulfonic acid; very particularly by N-(2-aminoethyl)-2-aminoethanesulfonic acid and its corresponding alkali metal salts, wherein the Na salt is most suitable, and a mixture of DETA and IPDA as component (d).

The way in which the molecular weight of the polyurethanes may be adjusted through choice of the proportions of the mutually reactive monomers and of the arithmetic mean of the number of reactive functional groups per molecule is common general knowledge in the field of polyurethane chemistry. Components (a) to (e) and their respective molar amounts are normally chosen such that the ratio A:B, where A is the molar amount of isocyanate groups and B is the sum of the molar amount of hydroxyl groups and the molar amount of functional groups which are capable of reacting with isocyanates in an addition reaction, is 0.5:1 to 2:1, preferably 0.8:1 to 1.5:1, particularly preferably 0.9:1 to 1.2:1. It is very particularly preferable when the ratio A:B is very close to 1:1.

The monomers (a) to (e) employed bear on average typically from 1.5 to 2.5, preferably from 1.9 to 2.1 and more preferably 2.0 isocyanate groups or functional groups capable of reacting with isocyanates in an addition reaction.

The polyaddition of components (a) to (e) to produce the polyurethane is preferably carried out at reaction temperatures of up to 180° C., preferably up to 150° C., under standard pressure or under autogenous pressure. The production of polyurethanes and of aqueous polyurethane dispersions is known to those skilled in the art.

In the context of the present invention an aqueous polyurethane dispersion is to be understood as meaning a dispersion which has an aqueous solvent as the continuous phase. Suitable aqueous solvents are water and mixtures of water with water-miscible solvents, for example alcohols, such as methanol, ethanol, n-propanol, isopropanol, n-butanol, sec-butanol, tert-butanol, n-hexanol and cyclohexanol; glycols, such as ethylene glycol, propylene glycol and butylene glycol; the methyl or ethyl ethers of dihydric alcohols, diethylene glycol, triethylene glycol, polyethylene glycols having number-average molecular weights up to about 3000, glycerol and dioxane, and ketones, such as acetone in particular. In one specific embodiment the polyurethane dispersion is substantially free from organic solvents. "Substantially free from organic solvents" is to be understood as meaning that the proportion of organic solvents is not more than 5% by weight, particularly preferably not more than 1% by weight, in particular not more than 0.1% by weight, based on the total weight of the solvent.

In a preferred embodiment the production of polyurethanes is carried out in the presence of at least one organic solvent. Preferred organic solvents for production of the polyurethanes are ketones, such as acetone and methyl ethyl ketone, and N-methylpyrrolidone. Particular preference is given to using acetone. If an at least partially water-miscible solvent is used to produce the polyurethanes, the polyurethane dispersion according to the invention may contain not only water but also the organic solvent used for production. It will be appreciated that the production of the polyurethane dispersions according to the invention may be carried out in the presence of at least one organic solvent, with said solvent subsequently being partially or completely replaced with water.

Preferred protection films are those where the detachment from a substrate takes place by adhesion failure of the radiation-crosslinked adhesive layer, wherein the adhesive layer detaches from the substrate and remains entirely on the polyolefin carrier material.

Preferred protection films are characterized in that the force for removal of the protection films from brushed steel is not more than 5 N/25 mm at 23° C. (see examples for methods of measurement).

The present invention also provides a process for producing protection films, wherein
(1) a polyolefin carrier material is precoated with at least one primer, wherein the primer is selected from polyurethane dispersions,
(2) a pressure-sensitive adhesive layer is applied to the primer layer, wherein the primer sure-sensitive adhesive layer is formed by radiation crosslinking of a radiation-crosslinkable hotmelt adhesive and wherein the radiation-crosslinkable hotmelt adhesive comprises at least one poly(meth)acrylate formed from
(i) at least 50% by weight of C1- to C18-alkyl (meth)acrylates and
(ii) at least one ethylenically unsaturated monomer which comprises at least one polar group, wherein the polar group is selected from carboxylic acid groups, carboxylic anhydride groups, hydroxyl groups, amide groups, urethane groups, urea groups, piperidinyl groups, piperazinyl groups, morpholinyl groups, imidazoyl groups, ureido groups, pyrrolidone groups and combinations of two or more of the recited groups, preferably at least one acid monomer, and wherein the radiation-crosslinkable hotmelt adhesive comprises at least one photoinitiator and the photoinitiator is in the form of an additive not bonded to the poly(meth)acrylate and/or the photoinitiator is incorporated into the poly(meth)acrylate by polymerization.

The protection films are suitable for protection of a very wide variety of substrate surfaces. The substrate surfaces may be of for example metal (for example brushed steel), glass, plastics (for example PVC, PMMA, PS, polycarbonate, polyester, polyamide, polyolefin) etc, and are suitable for protection from soiling or mechanical influences in particular during production and transport of the articles to be protected. The film is removed at the beginning of the intended final use or the remaining of the article in its intended use.

The protection films according to the invention feature good anchoring of the pressure-sensitive adhesive on the protection film,
residueless removal behavior from the widest possible range of substrate surfaces,
a constant peel strength even after aging,
a peel strength of preferably not more than 5 N/25 mm (see examples for methods of measurement).

EXAMPLES

Input Materials:
nBA n-butyl acrylate
2-EHA 2-ethlyhexyl acrylate
MMA methyl methacrylate
MA methyl acrylate
AA acrylic acid
Fl photoinitiator monomer: polymerizable photoinitiator (35% solution in MEK) of the formula F-1.
MEK methyl ethyl ketone
t-BPPiv tert-butyl perpivalate (75% solution in mineral oil)
t-BPOc tert-butyl peroctoate Emuldur® 381 A aqueous dispersion of an elastomeric polyester polyurethane, not chain extended with polyamine Luphen® 700 aqueous dispersion of an elastomeric polyester-polyurethane, chain extended with polyamine

Example V1 without Polar Monomers

In a polymerization apparatus consisting of a glass reactor, a reflux cooler, a stirrer and a nitrogen inlet 164.43 g of MEK are initially charged under a light nitrogen stream and heated to 80° C. As soon as a temperature of 70° C. was achieved 21.39 g of a monomer mixture consisting of 630.00 g of 2-EHA, 63.00 g of MMA and 20.00 g of Fl were added. Upon reaching 77° C. 1.47 g of a starter solution of 3.92 g of t-BPPiv and 32.90 g of MEK were added and the mixture was polymerized for 3 min at >79° C. Then the remaining 713.00 g of monomer mixture were added over 3 h and 36.82 g of starter solution were added over 3 h 15 min. The temperature was then increased to 90° C. over 15 min and a solution of 2.43 g of t-BPOc in 21.63 g of MEK was added over 30 min. The vacuum was then applied and the solvent was distilled off at not more than 135° C. and less than 50 mbar. The mixture was then degassed with slow stirring for 1 h at 135° C. and the maximum achievable vacuum. The melt was drained into a PP cup.

K value (1% in THF): 47.9
Zero-shear viscosity at 110° C.: 41.3 Pa s.

Example B1 with Polar Monomers

In a polymerization apparatus consisting of a glass reactor, a reflux cooler, a stirrer and a nitrogen inlet 211.41 g of MEK are initially charged under a light nitrogen stream and heated to 80° C. As soon as a temperature of 70° C. was achieved 27.50 g of a monomer mixture consisting of 810.00 g of 2-EHA, 58.50 g of MMA, 22.50 g of AA and 25.71 g of Fl were added. Upon reaching 77° C. 1.84 g of a starter solution of 3.60 g of t-BPPiv and 42.30 g of MEK were added and the mixture was polymerized for 3 min at >79° C. Then the remaining 916.71 g of monomer mixture were added over 3 h and 45.90 g of starter solution were added over 3 h 15 min. The temperature was then increased to 90° C. over 15 min and a solution of 3.12 g of t-BPOc in 27.81 g of MEK was added over 30 min. The vacuum was then applied and the solvent was distilled off at not more than 135° C. and less than 50 mbar. The mixture was then degassed with slow stirring for 1 h at 135° C. and the maximum achievable vacuum. The melt was drained into a PP cup.

K value (1% in THF): 47.3
Zero-shear viscosity at 110° C.: 58.9 Pa s.

Example B2 with Polar Monomers and Little Photoinitiator

In a polymerization apparatus consisting of a glass reactor, a reflux cooler, a stirrer and a nitrogen inlet 179.28 g of MEK are initially charged under a light nitrogen stream and heated to 80° C. As soon as a temperature of 70° C. was achieved 40.41 g of a monomer mixture consisting of 397.60 g of n-BA, 230.80 g of 2-EHA, 147.20 g of MA, 20.00 g of AA and 12.57 g of Fl were added. Upon reaching 77° C. 1.61 g of a starter solution of 3.41 g of t-BPPiv and 28.72 g of MEK were added and the mixture was polymerized for 3 min at >79° C. Then the remaining 808.17 g of monomer mixture were added over 2 h 45 min and 32.13 g of starter solution were added over 3 h. The temperature was then increased to 90° C. over 15 min and a solution of 1.55 g of t-BPOc in 19.20 g of MEK was added over 30 min. The vacuum was then applied and the solvent was distilled off at not more than 135° C. and less than 50 mbar. The mixture was then degassed with slow stirring for 1 h at 135° C. and the maximum achievable vacuum. The melt was drained into a PP cup.

K value (1% in THF): 50.5
Zero-shear viscosity at 130° C.: 70.0 Pa s.

Example B3 with Polar Monomers and Elevated Photoinitiator Content

In a polymerization apparatus consisting of a glass reactor, a reflux cooler, a stirrer and a nitrogen inlet 179.28 g of MEK are initially charged under a light nitrogen stream and heated to 80° C. As soon as a temperature of 70° C. was achieved 40.74 g of a monomer mixture consisting of 394.00 g of n-BA, 230.80 g of 2-EHA, 147.20 g of MA, 20.00 g of AA and 22.86 g of Fl were added. Upon reaching 77° C. 1.65 g of a starter solution of 4.27 g of t-BPPiv and 28.72 g of MEK were added and the mixture was polymerized for 3 min at >79° C. Then the remaining 814.86 g of monomer mixture were added over 2 h 45 min and 32.99 g of starter solution were added over 3 h. The temperature was then increased to 90° C. over 15 min and a solution of 2.03 g of t-BPPiv in 19.20 g of MEK was added over 30 min. The vacuum was then applied and the solvent was distilled off at not more than 135° C. and less than 50 mbar. The mixture was then degassed with slow stirring for 1 h at 135° C. and the maximum achievable vacuum. The melt was drained into a PP cup.

K value (1% in THF): 47.5
Zero-shear viscosity at 130° C.: 49.0 Pa s

Example B4 with Polar Monomers and Elevated Photoinitiator Content

In a polymerization apparatus consisting of a glass reactor, a reflux cooler, a starer and a nitrogen inlet 179.28 g of MEK are initially charged under a light nitrogen stream and heated to 80° C. As soon as a temperature of 70° C. was achieved 41.65 g of a monomer mixture consisting of 389.20 g of n-BA, 230.80 g of 2-EHA, 147.20 g of MA, 20.00 g of AA and 45.71 g of Fl were added. Upon reaching 77° C. 1.65 g of a starter solution of 4.27 g of t-BPPiv and 28.72 g of MEK were added and the mixture was polymerized for 3 min at >79° C. Then the remaining 832.91 g of monomer mixture were added over 2 h 45 min and 32.99 g of starter solution were added over 3 h. The temperature was then increased to 90° C. over 15 min and a solution of 2.03 g of t-BPPiv in 19.20 g of MEK was added over 30 min. The vacuum was then applied and the solvent was distilled off at not more than 135° C. and less than 50 mbar. The mixture was then degassed with slow stirring for 1 h at 135° C. and the maximum achievable vacuum. The melt was drained into a PP cup.

K value (1% in THF): 47.0
Zero-shear viscosity at 130° C.: 38.2 Pa s

Measurement of Zero-Shear Viscosity

The zero-shear viscosity is the threshold value of the viscosity function at infinitely low shear rates. It is measured with an Anton Paar MCR 100 rheometer (US 200 evaluation software) in plate/plate geometry. The samples are measured under oscillatory shear at a small shear amplitude of 10%. Temperature 130° C. (or as stated), angular frequency ramp log 100-0.1 1/s, measuring gap 0.5 mm, evaluation according to Carreau-Gahleitner I, piston diameter 25 mm.

Film Pretreatment:

F1 (comparative): corona-pretreated PE film

F2-F3: PE film precoated with adhesion promoter (primer);

in each case coated with 0.3 g/m² (solid) of primer (cf. table 1)

F4 (comparative): plasma-pretreated film

In the corona treatment the film surface is treated by a dielectric discharge in the atmosphere of the ambient air. The discharge activates a multiplicity of chemical reactions between the ambient air and the film surface. This increases the surface energy of the film, which provides for better wettability for example.

By contrast with the corona treatment in the plasma treatment the discharging takes place in an atmosphere with an elevated nitrogen content. This allows the effectiveness of the surface treatment to be further improved by further increasing the surface energy of the film.

Film Precoating Procedure:

For precoating, a corona-pretreated 50 μm polyethylene film is coated with an aqueous primer dispersion. The application rate after drying is 0.3 g/m².

TABLE 1

Primer for film precoating

| Example | Primer | |
|---|---|---|
| F2 | Emuldur ® 381 A | polyurethane dispersion |
| F3 | Luphen ® 700 | polyurethane dispersion |

Performance Tests:

All measurements are carried out at room temperature (20° C.) unless explicitly otherwise stated.

The pressure-sensitive adhesives were heated to 120° C. and from the melt doctor-coated onto siliconized PET film at an application rate of 10 g/m² (for assessing the anchoring on the carrier film) or 15 g/m² (for assessing ease of removal from brushed steel) and irradiated with UVC light. The film was then transferred to a commercially available pretreated 50 μm PE film as described above (cf. table 1) as a carrier. The carrier coated with a pressure-sensitive adhesive was cut into 25 mm wide test strips.

a) Anchoring on PE Film

Polyethylene film strips (PE) coated with adhesive are examined with regard to the adhesion of the adhesive to the PE carrier. An attempt is made to rub the adhesive layer off the PE film at one point with a thumb (max. 10 repetitions). The quality of the anchoring is assessed using grades:

0: easy to rub off;
1: quite hard to rub off;
2: hard to rub off;
3: very hard to rub off;
4: impossible to rub off.

The target results are ideally impossible to rub off or very hard to rub off.

b) Ease of Removal from Brushed Steel

In the determination of peel strength (adhesion) a 25 mm wide test strip is in each case bonded to a test specimen made of brushed steel (Ra=2.5 μm) and rolled once with a 1 kg roller. One end is then clamped in the upper jaws of a tensile strain tester. The adhesive strip is removed from the test surface at a speed of 300 mm/min and an angle of 180°, i.e. the adhesive strip is bent and removed parallel to the test specimen and the force required therefor is measured. The measure for peel strength is the force in N/25 mm obtained as the average value from at least two measurements. Peel strength is determined after 24 h and 7 d from bonding under defined storage conditions. The test method corresponds substantially to the Finat test method FTM 1.

Ease of removal is assessed by examination of the residues on the substrate surface (brushed steel):

A: adhesion failure, no residues;

R: adhesion failure, isolated residues;

K: cohesion failure, film splits between substrate and carrier;

A0: swapover, complete transfer of the adhesive film from the carrier to the substrate.

The target result is ideally residueless removal. In addition the force required for removal is measured in N/25 mm. The target result is the lowest possible removal force in the range of 0.5-5 N/25 mm at room temperature (23° C.).

The results are summarized in tables 2 to 3.

TABLE 2

Effects of film pretreatment on anchoring of the pressure-sensitive adhesive on PE film

| | | UV | Anchoring after | | |
|---|---|---|---|---|---|
| Ex. | Film | dose [1] [mJ/cm²] | 24 h standard climate [2] | 7 d standard climate [2] | 24 h under water |
| V1 [3] | F1 [3] | 60 | 0 | 0 | 1-2 |
| V1 [3] | F3 | 60 | 1 | 1 | 4 |
| B2 | F1 [3] | 60 | 0-1 | 1 | 3 |
| B2 | F2 | 60 | 1-2 | not determined | not determined |
| B2 | F3 | 60 | 3 | 3-4 | 4 |
| B2 | F4 [3] | 60 | 1 | not determined | not determined |
| B4 | F1 [3] | 60 | 1-2 | 1-2 | 3 |
| B4 | F2 | 60 | 2-3 | not determined | not determined |
| B4 | F3 | 60 | 4 | 4 | 4 |
| B4 | F4 [3] | 60 | 2 | not determined | not determined |

[1] UV-C radiation dose
[2] 23° C., 50% rel. humidity
[3] comparative test

The results show that anchoring on the PE film can be optimized by pretreatment. Plasma pretreatment improves this only slightly compared to corona pretreatment (F1 vs. F4). The polyurethane-based primers (F2, F3) result in better anchoring than corona or plasma pretreatment alone (F1, F4). Luphen® 700 (polyurethane) (F3) is particularly suitable.

The presence of polar groups in the hotmelt adhesive is advantageous for good anchoring on primed film: In the absence of such groups even inventive primers (V1/F3) achieve less satisfactory anchoring compared to inventive hotmelt adhesive comprising polar groups (B2/F3, B4/F3). A higher crosslinking density of the pressure-sensitive adhesive is also advantageous (B4 vs. B2).

TABLE 3

Effect of crosslinking density of the pressure-sensitive adhesive on ease of removal

| Ex. | Film | UV dose [1] [mJ/cm$^2$] | Ease of removal after | | |
|---|---|---|---|---|---|
| | | | 24 h standard climate [2] | 7 d standard climate [2] | 7 d at 50° C./ 85% r.h. |
| B4 | F3 | 0 | R—13.5N/25 mm | R—10N/25 mm | K—16N/25 mm |
| B4 | F3 | 20 | A—2N/25 mm | A—2N/25 mm | A—1N/25 mm |
| B4 | F3 | 60 | A—0.5N/25 mm | A—0.5N/2 mm | A—0.5N/25 mm |
| B1 | F3 | 0 | K—10N/25 mm | K—9N/25 mm | K—9N/25 mm |
| B1 | F3 | 20 | A—2N/25 mm | A—2N/25 mm | A—N/25 mm |
| B1 | F3 | 60 | A—1.7N/25 mm | A—1.6N/25 mm | A—1.3N/25 mm |

[1] UV-C radiation dose
[2] 23°C., 50% rel. humidity
A: adhesion failure, no residues
R: adhesion failure, isolated residues
K: cohesion failure The results show that with increasing crosslinking density (higher UV dose) residueless removal is possible when using the pretreated PE film. Even the uncrosslinked samples (UV dose 0) show no swapover which demonstrates the good anchorage resulting from use of the primed film (F3). Further increasing the UV dose (UV dose of 60) reduces the removal force without altering removal behavior.

Contact Angle Measurements:

To examine the differences between the primer Luphen® 700 (polyurethane 1) (F3) on the one hand and the primer Emuldur® 381 A (polyurethane 2) (F2) on the other hand, the contact angle of a water droplet on the primed films was determined.

To this end triplicate measurements were taken on three different sites of the pretreated film in each case. In each case three test strips of 1×5 cm were cut out of the film in defined regions (cf. FIG. 1) and wetted with a droplet of water, Measurement of contact angle was carried out with an instrument from Krüss (Krüss DAS 100).

FIG. 1 indicates the position of the three test strips #1, #2 and #3.

The average values of triplicate measurements on the three test strips are shown in each case:

TABLE 4

Contact angle of dist. water on PE film treated with different primers

| | Contact angle (H$_2$O) | | |
|---|---|---|---|
| Film | Strip #1 | Strip #2 | Strip #3 |
| F2 | 102.3° +/− 1.1° | 83.3° +/− 4° | 76.9° +/− 1.8° |
| F3 | 80.2° +/− 0.9° | 79.1° +/− 2.3° | 80.7° +/− 1.9° |

The standard deviations of the triple determinations are low, thus indicating that the measured results may be regarded as reproducible. It is striking that in example F2 there are significant deviations in the contact angle from one test strip to another while the primed film F3 has contact angles on all three test strips that differ from one another only slightly. Different contact angles occur in the case of different polarities of the surfaces and these may be brought about for instance by incomplete wetting or concentration of surface-active substances. They may be an indication of an inhomogeneous film surface which reduces anchoring efficiency. F3 is particularly preferred since this example has a highly homogeneous film surface which brings about good anchoring of the adhesive to the film.

The invention claimed is:

1. A removable protection film comprising:
   (a) a polyolefin carrier material whose surface to be coated has been pretreated, wherein the carrier material is selected from the group consisting of polyethylene and polypropylene,
   (b) a precoating of the polyolefin carrier material with at least one primer selected from aqueous polyurethane dispersions, the aqueous polyurethane dispersions consisting of a polyurethane dispersed in an aqueous solvent; and
   (c) a pressure-sensitive adhesive layer, wherein the pressure-sensitive adhesive layer is formed by radiation crosslinking of a radiation-crosslinkable hotmelt adhesive and wherein the radiation-crosslinkable hotmelt adhesive comprises at least one poly(meth)acrylate formed from
      (i) at least 60% by weight of C4-to C10-alkyl (meth)acrylates and
      (ii) at least one ethylenically unsaturated monomer which comprises at least one polar group, wherein the polar group is selected from the group consisting of carboxylic acid groups, carboxylic anhydride groups, hydroxyl groups, amide groups, urethane groups, urea groups, piperidinyl groups, piperazinyl groups, morpholinyl groups, imidazoyl groups, ureido groups, pyrrolidone groups and combinations of two or more of the recited groups;
   wherein the at least one poly(meth)acrylate of the radiation-crosslinkable hotmelt adhesive has a K value of at least 30, and wherein before crosslinking the at least one poly(meth)acrylate has a glass transition temperature of not more than 10° C.,
   and wherein the radiation-crosslinkable hotmelt adhesive includes at least one photoinitiator and the photoinitiator is in the form of an additive not bonded to the at least one poly(meth)acrylate and/or the photoinitiator is incorporated into the at least one poly(meth)acrylate by polymerization, wherein the removable protection film exhibits a force for removal of the removable protection film from brushed steel of not more than 5 N/25 mm at 23° C.

2. The protection film according to claim 1, wherein the polyurethane of the polyurethane dispersion is constructed from a) diisocyanates,
b) at least one diol, of which
   b1) 10 to 100 mol % based on the total amount of the diols (b) have a molecular weight of 500 to 5000 g/mol and
   b2) 0 to 90 mol % based on the total amount of diols (b) have a molecular weight of 60 to 500 g/mol,
c) at least one monomer distinct from the monomers (a) and (b) having at least one isocyanate group or at least one isocyanate-reactive group which further bears at least one hydrophilic group and
d) optionally at least one further compound distinct from the monomers (a) to (c) having at least two reactive groups selected from alcoholic hydroxyl groups, primary or secondary amino groups or isocyanate groups and
e) optionally at least one monofunctional compound distinct from monomers (a) to (d) having a reactive group which is an alcoholic hydroxyl group, a primary or secondary amino group or an isocyanate group.

3. The protection film according to claim 2, wherein
the diisocyanates a) are selected from diisocyanates of the formula $X(NCO)_2$, wherein X represents an acyclic aliphatic hydrocarbon radical having 4 to 15 carbon atoms, a cycloaliphatic hydrocarbon radical having 6 to 15 carbon atoms, an aromatic hydrocarbon radical having 6 to 15 carbon atoms or an araliphatic hydrocarbon radical having 7 to 15 carbon atoms;
the diols b1) are selected from polyester diols, polycarbonate diols and polyether diols; and the compound c) is selected from dihydroxycarboxylic acids, diaminocarboxylic acids and diaminosulfonic acids.

4. The protection film according to claim 1, wherein the polyurethane comprises anionic groups, and wherein a content of anionic groups in the polyurethane is 30 to 1000 mmol/kg of polyurethane.

5. The protection film according to claim 1, wherein the polyurethane of the polyurethane dispersion is formed using at least one amorphous polymeric polyester polyol.

6. The protection film according to claim 5, wherein the at least one amorphous polyester polyol is constructed from a mixture of at least one aliphatic dicarboxylic acid having 3 to 10 carbon atoms and at least one aromatic dicarboxylic acid in a ratio of 0.5:1 to 2:1 and at least one alkanediol having 2 to 10 carbon atoms.

7. The protection film according to claim 6, wherein the amorphous polyester is constructed from a mixture of an at least one aliphatic dicarboxylic acid having 3 to 10 carbon atoms and at least one aromatic dicarboxylic acid in a ratio of 0.5:1 to 2:1 and at the least one alkanediol having 4 to 8 carbon atoms.

8. The protection film according to claim 1, wherein the polyurethane of the polyurethane dispersion comprises 10% to 80% by weight of at least one amorphous polyester diol having a molecular weight of more than 500 and up to 4000 g/mol and the at least one amorphous polyester diol is composed of a mixture of at least one aliphatic dicarboxylic acid having 3 to 10 carbon atoms and at least one aromatic dicarboxylic acid in a ratio of 0.5:1 to 2:1 and at least one alkanediol having 2 to 10 carbon atoms.

9. The protection film according to claim 1, wherein the polyurethane of the polyurethane dispersion is chain-extended with at least one polyamine.

10. The protection film according to claim 1, wherein the radiation-crosslinkable poly(meth)acrylate is crosslinkable by irradiation with UV light and the photoinitiator is copolymerized into the radiation-crosslinkable poly(meth)acrylate in the form of an ethylenically unsaturated, copolymerizable photoinitiator in an amount of not less than 0.5% by weight.

11. The protection film according to claim 1, wherein the radiation-crosslinkable poly(meth)acrylate comprises 0.1% to 30% by weight, from the at least one monomer which comprises at least one polar group.

12. The protection film according to claim 1, wherein the at least one radiation-crosslinkable poly(meth)acrylate is formed from
   (a1) at least 60% by weight of at least one acrylate selected from the group consisting of n-butyl acrylate, n-hexyl acrylate, 2-ethylhexyl acrylate, propylheptylacrylate and mixtures thereof,
   (a2) 1% to 5% by weight of at least one monomer having polar groups, wherein the polar groups are selected from the group consisting of carboxylic acid groups, carboxamide groups, pyrrolidone groups, urethane groups and urea groups,
   (a3) 0.5% to 4% by weight of at least one ethylenically unsaturated copolymerizeable photoinitiator, and
   (a4) 0% to 25% by weight of at least one further monomer distinct from the monomers (a1) to (a3).

13. The protection film according to claim 1, wherein an application rate of a pressure-sensitive adhesive in the pressure-sensitive adhesive layer (c) is at least 2 $g/m^2$.

14. The protection film according to claim 1, wherein detachment from a substrate takes place by adhesion failure of a radiation-crosslinked adhesive layer, wherein the pressure-sensitive adhesive layer (c) detaches from the substrate and remains entirely on the polyolefin carrier material.

15. The protection film according to claim 1, wherein the force for removal of the protection film from brushed steel is from 0.5 to 5 N/25 mm at 23° C.

16. A process for producing protection films, comprising:
   (1) precoating a polyolefin carrier material whose surface to be coated has been pretreated with at least one primer, wherein the at least one primer is selected from polyurethane dispersions, the aqueous polyurethane dispersions consisting of a polyurethane dispersed in an aqueous solvent, thereby forming a primer layer; and
   (2) applying a pressure-sensitive adhesive layer to the primer layer, wherein the pressure-sensitive adhesive layer is formed by radiation crosslinking of a radiation-crosslinkable hotmelt adhesive and wherein the radiation-crosslinkable hotmelt adhesive comprises at least one poly(meth)acrylate, wherein before crosslinking the at least one radiation-crosslinkable poly(meth)acrylate has a glass transition temperature of not more than 10° C., formed from
      (i) at least 50% by weight of C1-to C18-alkyl (meth)acrylates and
      (ii) at least one ethylenically unsaturated monomer which comprises at least one polar group, wherein the polar group is selected from the group consisting of carboxylic acid groups, carboxylic anhydride groups, hydroxyl groups, amide groups, urethane groups, urea groups, piperidinyl groups, piperazinyl groups, morpholinyl groups, imidazoyl groups, ureido groups, pyrrolidone groups and combinations of two or more of the recited groups;
   and wherein the radiation-crosslinkable hotmelt adhesive includes at least one photoinitiator and the photoinitiator is in the form of an additive not bonded to the at least one poly(meth)acrylate and/or the photoinitiator is incorporated into the at least one poly(meth)acrylate by polymerization.

\* \* \* \* \*